350-358 SR

XR 3,800,303

United Stat

Picquendar et al.

[11] 3,800,303

[45] Mar. 26, 1974

[54] ELECTRICALLY CONTROLLED GRAPHIC REPRODUCTION SYSTEM

[75] Inventors: Jean Edgar Picquendar; Roger Torguet, both of Paris, France

[73] Assignee: Thomson-CSF, Paris, France

[22] Filed: Mar. 1, 1972

[21] Appl. No.: 230,642

[30] Foreign Application Priority Data

Mar. 5, 1971 France .............................. 71.07612

[52] U.S. Cl. ..................... 95/4.5 R, 350/161, 355/3, 178/7.3 D

[51] Int. Cl. .......................... B41b 19/00, H04r 3/10

[58] Field of Search .................... 95/4.5 R; 355/3, 5; 350/161; 178/7.3 D

[56] References Cited

UNITED STATES PATENTS

| | | | |
|---|---|---|---|
| 3,514,534 | 5/1970 | Korpel | 350/161 X |
| 3,330,190 | 7/1967 | Taillie | 95/4.5 R X |
| 3,353,894 | 11/1967 | Harris | 95/4.5 R X |
| 3,055,258 | 9/1962 | Hurvitz | 350/161 X |

*Primary Examiner*—Robert P. Greiner
*Attorney, Agent, or Firm*—Cushman, Darby & Cushman

[57] ABSTRACT

The present invention relates to graphic reproduction systems capable of printing onto a photosensitive material or transferring to a substrate graphic forms such as those displayed upon the screen of a cathode-ray device.

According to the present invention there is provided a graphic reproduction system wherein the writing assembly comprises : a quasi-monochromatic light source, acousto-optical modulator means transmitting the radiant energy beam issuing from said source and acousto-topical means associated with anamorphotic means of prism-type, for deflecting the modulated beam emerging from said acousto-optical modulator means.

The invention allows the graphic reproduction of data displayed upon the screen of an arbitrary display device, as well as the distant graphic reproduction of arbitrary graphic forms.

16 Claims, 11 Drawing Figures

3800303
OR IN 354/6

ELECTRICALLY CONTROLLED GRAPHIC REPRODUCTION SYSTEM

The present invention relates to systems for the graphic reproduction of optical signals of the kind displayed upon the screen of a cathode-ray tube ; these optical signals may occur in one or other of the following forms :

The oscillogram of an electrical signal, a pattern built up from a television raster, or a text in which the characters are arranged in successive lines.

The optical detector used for the graphic reproduction of optical signals is generally a photosensitive recarding medium constituted by a spool of photosensitive paper which is printed with the help of electrical signals which act upon the intensity and the location in a plane or line, of a luminous area which can be reduced to a point or spot.

It is the current practice to utilise in conjunction with a data-processing machine an image storage display device with which there can be associated a graphic reproduction system in order to retain the displayed information trace in recorded form. In one known embodiment, the graphic reproduction apparatus is constituted by a cathode-ray rube the electronically excited luminescence of which is optically coupled with a photosensitive paper by optical fibres which traverse th face plate of the tube. This technique makes it possible to achieve excellent results but does not produce a very high intensity light output since the latter is limited on the one hand by the energy output of the phosphor material and on the other hand by the energy and current density of the electron beam. To this, it ought to be added that the deflection of an electron beam requires a large amount of scanning energy if the accelerating voltage and scanning speed are high.

Instead of using an electron beam, it is possible to make direct use of a high-intensity light beam which is modulated and deflected at high speed. However, if we exclude mirror systems which are too slow, then it will be found that the majority of known modulators and electro-optical deflectors have the following drawbacks :

Insufficient transmission efficiency, unwanted optical aberrations, a substantial bulk and, in some cases, the need for delicate setting up and adjusting operations.

In view of the foregoing, the invention proposes a graphic reproduction system which utilises a quasi-monochromatic radiant energy source which can for example be constituted by a laser emitting blue or green radiation. The modulation and deflection of the radiation are based entirely upon the interaction of the light with an ultrasonic energy beam under conditions in which the latter can achieve an optical efficiency close to unity.

This kind of combination of acousto-optical means makes it possible to produce a graphic reproduction equipment which is both simple, accurate and relatively inexpensive.

According to the present invention, there is provided, a graphic reproduction system for storing onto a substrate graphic information items under the control of electrical signals supplied from a data source, said system comprising : a substantially monochromatic source emitting a beam of radiant energy, photosensitive recarding means positioned for receiving said beam, and positioned between said monochromatic source and said optical detection means, acousto-optical means controlled by said electrical signal for causing said beam to scan said photosensitive recarding means along at least one direction and to modulate the intensity of the radiant energy falling onto said photosensitive recarding means ; said acousto-optical means comprising at least one refringent medium located on the transmission path of said beam, and ultrasonic generator means controlled by said electrical signals for radiating within said medium at least one ultrasonic wave intersecting said beam ; said ultrasonic wave creating within said medium a refractive diffraction grating selectively scattering toward said photosensitive recarding means a portion of said radiant energy.

For a better understanding of the invention, and to show how the same may be carried into effect, reference will be made to the ensuing description and the attached figures among which :

FIG. 1 schematically illustrates a graphic reproduction system in accordance with the invention.

Figure 6:
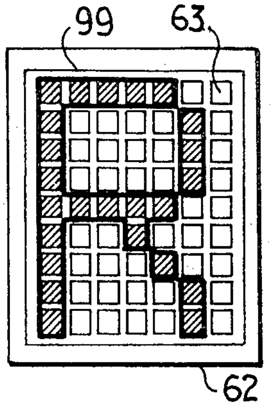

FIGS. 6, *7a*, *7b*, *7c* and *7d* are explanatory figures.

Figure 1:
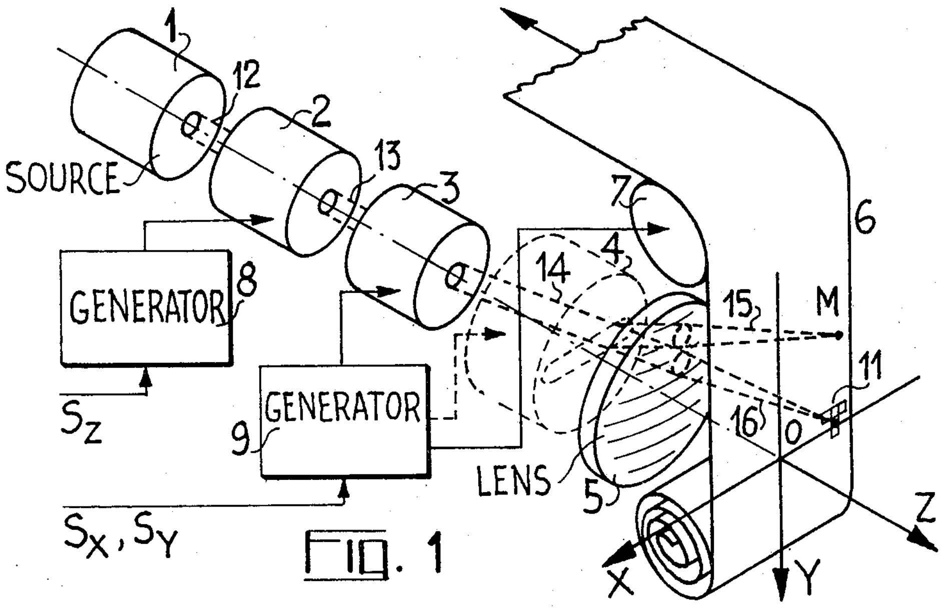
Figure 8:
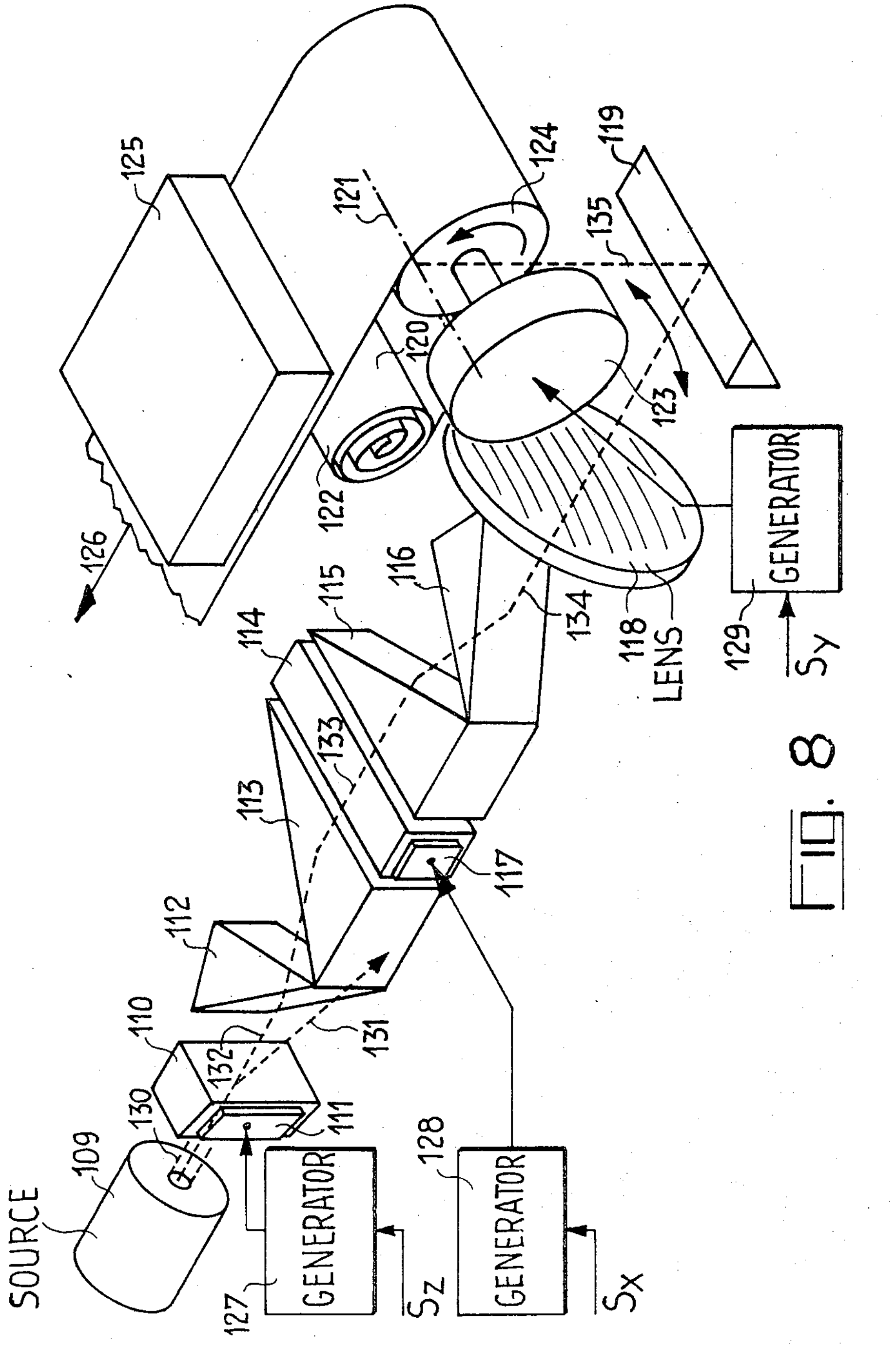

FIG. 8 illustrates a third embodiment of the system of FIG. 1.

In FIG. 1, a quasi-monochromatic radiant energy source 1 can be seen, which can for example be constituted by an argon laser ; the light from this source is capable of exciting an optical detector 6. The light beam produced by the source 1 on the axis OZ is received by an acousto-optical modulator 2, to which an electrical generator 8 applies an alternating voltage whose frequency varies under the action of an electrical modulating signal $S_Z$. The modulated beam 13 emerging from the modulator is received by an acousto-optical deflector 3 whose deflection plane is the plane XoZ. The deflector 3 receives an alternating scanning voltage produced by an electrical generator 9 ; the frequency of this alternating voltage varies as a function of an electrical signal $S_X$ applied to the generator 9.

In broken line, in FIG. 1, another acousto-optical deflector 4, whose deflection plane is YoZ, has been illustrated and this receives the deflected beam 14 emerging from the deflector 3 as well as an alternating voltage coming from a generator 9 ; the latter has a frequency which varies as a function of an electrical signal $S_Y$ applied to the generator 9. A projection lens 5 picks up the light emerging, as the case may be, from the deflector 3 or the deflector system 3, 4, and forms a light spot 11 on a photosensitive surface of the optical detector 6. The light spot 11 occupies an abscisse position on the axis OX, which depends upon the signal $S_X$. This spot 11 is produced by the convergent beam 16 emerging from the lens 5 and may take the form of a point or a printed character.

In the presence of the element 4, the deflection is two-directional ; the beam 15 emerging from the lens 5 then terminates at an arbitrary point M on the plane XOY. In FIG. 1, it can be seen that the detector 6 is constituted by a strip of paper ; this paper is unwound from a spool 10 and is transported in a plane XOY under the control of the transfer mechanism 7 whose movement is controlled by the generator 9. In the case of unidirection deflection along the line OX, the transfer of the paper enables line-by-line printing, or again printing of an oscillogram trace, to be effected.

The operation of the elements 2, 3 and 4 of FIG. 1 is based upon the acousto-optic interaction of the light waves and the ultrasonic waves in a refractive elastic medium.

Figure 2:
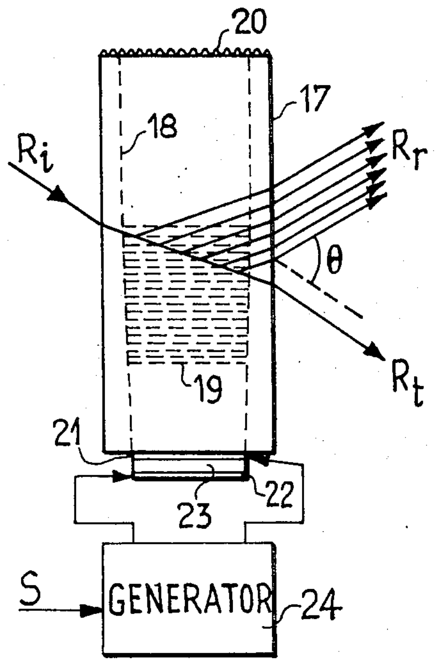
FIGS. 2 and 3 are explanatory illustrations.

In FIG. 2, a block 17 of refractive elastic material, can be seen, upon the bottom face of which there is arranged an electro-mechanical transducer comprising a piezoelectric wafer 22 and two electrodes 21 and 23. An a.c. voltage generator 24 connected to electrodes 21 and 22 excites an ultrasonic beam 18 in the block 17 ; the ultrasonic wave 18 modulates the refractive index of the block 17 and, in propagating towards the absorbtive face 20, forms a grating 19 the pitch of which is equal to the ultrasonic wavelength λa. In the absence of any ultrasonic signal, a light ray $R_i$ incident on one of the lateral faces of the bar 17, is transmitted in the form of a ray $R_t$. When the ultrasonic wave 18 is excited, the refractive grating 19 partially diffracts the energy of the incident light ray ; the diffracted energy fraction emerges from the block 17 in the form of radiation $R_r$ making an angle $\theta$ with the ray $R_t$. The angle $\theta$ depends upon the ratio λo/λa where λo is the optical wavelength of the light ray ; in addition, there is a particular angle of incidence known as the Bragg angle for which the energy of the radiation $R_r$ reaches a maximum value which is very close to the energy of the ray $R_i$ provided that the ultrasonic amplitude is sufficiently high. The portion of energy not deflected by the ultrasonic wave maintains a fixed direction in relation to the ray $R_i$ ; it reduces when the vibrational amplitude is increased and still propagates in the direction $R_t$.

Thus, the device of FIG. 2 can be used as an acousto-optical modulator by using the fraction $R_t$ of the radiation transmitted by the block 17 ; in this case, the generator 24 is amplitude-modulated by a modulating voltage S which is applied to it.

Considering now the diffracted radiation $R_r$ and neglecting the radiation $R_t$, the device shown in FIG. 2 can be used as an acousto-optical deflector. If the ultrasonic wave has a substantially constant amplitude, a ray $R_i$ of constant direction will be diffracted in the form of radiation $R_r$ the direction of which will be modified as a function of the frequency of the ultrasonic wave. If the generator 24 is frequency-modulated by an electrical scanning signal $S$, the system of FIG. 2 constitutes an acousto-optical deflector whose deflection plane is the plane of the figure.

In the foregoing, the opto-acoustical interaction has made it possible to produce a light modulator capable of modulating the intensity of the light beam under the control of an electrical signal, without spatially modifying the transverse distribution of the light beam.

Figure 3:
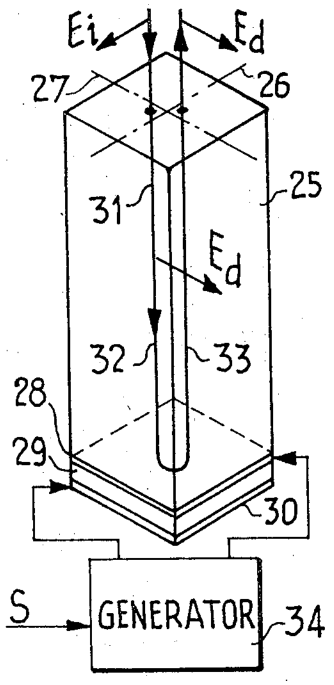

In FIG. 3, a device can be seen in which the acousto-optical interaction takes place between a light wave and an ultrasonic wave, the two propagating in opposite directions. The block 25 is cut in a double-refracting material the principal axes 26 and 27 of which are orientated in the manner indicated in FIG. 3. The bottom, reflective face of the block 25 carries an electromechanical transducer constituted by a piezoelectric wafer 29 equipped with electrodes 28 and 30. An a.c. voltage generator 34 is connected to the electrodes 28 and 30. If the top face of the block receives a light wave 31 whose electrical vector $\vec{Ei}$ is parallel to the principal axis 26, this wave will traverse the block 25 vertically and return upwards again after being reflected at the bottom face of the block. If an ultrasonic wave is excited, giving rise to a light wave 32 whose electrical vector $\vec{Ed}$ is parallel to the principal axis 27, this will be reflected at the bottom face of the block 25 and will travel back up towards the top face along the trajectory 33. If the wave numbers of the waves $\vec{Ei}$, $\vec{Ed}$ and the ultrasonic wave are respectively $\vec{k_i}$, $\vec{k_d}$, and $\vec{k}$, then it can be shown that the relationship satisfied by the interaction is :

$$\vec{k_i} = \vec{k_d} \pm \vec{k}$$

By arranging a polarisation analyser at the exit from the top face of the block 25, the wave of electrical vector $\vec{Ed}$ can be selected, this only existing if the ultrasonic wave is present. In looking through the analyser, everything happens as if the bottom face of the block 25 were a reflective face whose coefficient of reflection is zero in the absence of an ultrasonic excitation and close to unity when said excitation is present. If the generator 34 is controlled in such a fashion that the amplitude of the alternating voltage varies under the control of a modulating signal S, the device of FIG. 3 will behave as an acousto-optical modulating cell.

By forming a bundle of several modulating cells, a spatial acousto-optical modulator is produced.

The acousto-optical devices of FIGS. 2 and 3 can be utilised to produce the modulator 2 and the deflectors 3 and 4, of FIG. 1. They have the advantage that their characteristics are extremely stable ; they can modulate or deflect light very rapidly since the modulation affects the amplitude or frequency of an ultrasonic wave having a frequency of several hundreds of megacycles ; in addition the electromechanical transducers can be excited by means of alternating voltages of some few volts, enabling them to be controlled by means of transistor generators. Other advantages will become apparent during the course of the ensuing description.

Figure 4:
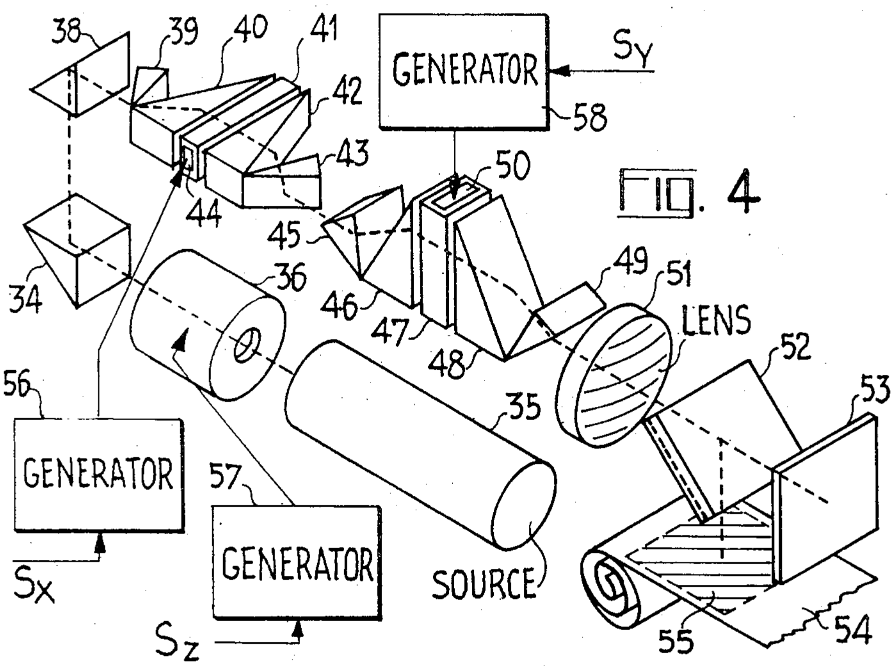
FIG. 4 illustrates a first variant embodiment of the system shown in FIG. 1.

In FIG. 4, a first variant embodiment of the graphic reproduction system in accordance with the invention, can be seen. It comprises a monochromatic light source 35 producing a light beam whose trajectory is illustrated by a broken line. The beam first of all passes through an acousto-optical modulator 36 which receives an alternating voltage produced by a generator 57 ; the amplitude of this alternating voltage is controlled by a modulating signal $S_Z$ applied to the generator 57. The modulated beam emerging from the modulator 36 is transmitted through a pair of prisms 37 and 38 to a first deflection system comprising an acousto-optical cell 41 equipped with an electro-mechanical transducer 44 and two sets of prisms, 39, 40 and 42, 43. The transducer 44 is excited by an alternating voltage produced by a generator 56 ; the frequency of this alternating voltage is controlled by an electrical scanning signal $Sx$ so that the latter produces deflection of the beam emerging from the prism 38, in a deflection plane at the triangular faces of the prisms 39, 40, 42 and 43. A second deflection system similar to the foregoing one, receives the modulated and deflected beam emerging from the prism 43 ; it comprises a cell 47 and a transducer 50, plus prisms 45, 46, 48 and 49. A generator 58 supplies the transducer 50 with an alternating excitation voltage whose frequency is controlled by the electrical scanning signal $S_Y$.

The plane of deflection of the system 45 and 50, is parallel to the triangular faces of the prisms 45, 46, 48 and 49. It is, for example, perpendicular to the plane of deflection of the other deflection system. The beam emerging from the prism 49 is received by a projection lens 51 which projects a point of light onto a ground screen 53 ; a semireflective plate 52 picks up a substantial fraction of the light energy produced by the lens 51 and projects it onto a photosensitive paper 54 the area 55 of which receives an illumination corresponding to that received by the ground screen 53.

The operation of the graphic reproduction system shown in FIG. 4, derives directly from that of the system shown in FIG. 1. The signals $S_X$, $S_y$ and $S_z$ are those normally appearing at the electrodes of a cathode-ray tube when they are connected to a horizontal deflection amplifier, a vertical deflection amplifier and a beam modulation amplifier. The system can thus provide a graphic reproduction of an oscillogram which can be observed on the ground screen 53 before the surface 55 of the photosensitive paper 54 is exposed. The small size of the device shown in FIG. 4 is due largely to the use of sets of prisms 39, 40, 42, 43, 45, 46, 48 and 49. these prisms fulfil two major functions and introduce no distortion or loss of light.

The acousto-optical cell 41, like the corresponding one in FIG. 2, produces an angular deflection accompanied by a slight variation in the intensity of the deflected radiation. This variation in intensity is negligible provided that the extent of the deflection range is limited to a few degrees. If the cell 41 is followed by an anamorphotic system consituted by the set of prisms 42, 43, a substantial amplification of the deflection range is obtained. A set of prisms 39, 40, similar to the other is arranged upstream of the cell 41 in order to neutralise the anamorphotic effect without at the same time losing the deflection amplification obtained downstream of the cell.

This combination presents two additional substantial advantages ; in other words, the beam emerging from the prism 38 is a thin circular beam which has to be expanded in the direction of the ultrasonic wave in order to achieve good angular resolution in the deflection plane ; this is achieved in fact by the prisms 39 and 40 but this enlargement does not take place in the direction perpendicular to the deflection plane so that there is no need to supply a large amount of ultrasonic power. The prisms 39 and 40 are advantageously cut in such a fashion that their entry faces receive the beam at the Brewster angle $\theta$ ; their exit faces are normal to the exit beam ; it can be shown that the angle made between the entry and exit faces of each prism is equal to the complement of the Brewster angle $\theta$ which is given by the relationship :

$$\tan = \theta = n$$

where $n$ is the refractive index of the medium from which the prisms are cut.

The trains of prisms 39, 40 and 42, 43, in this version, are symmetrical in relation to the axis of the cell 41 ; the only light losses occur on transit of the faces which are normal to the beam ; these losses can be reduced by an antireflective treatment applied to these faces.

The deflection systems of FIG. 4 have no inherent aberrations and are capable of undistorted deflection of light beams which are transmitting an optical image.

Without departing from the scope of the present invention, a simplification can be introduced into the system of FIG. 4. This consists in arranging for at least one of the two acousto-optical deflection systems to do duty as a modulator. We have seen, at the time of the description of FIG. 2, that the direction of exit of the radiation $R_R$ diffracted by the ultrasonic wave, is a function of the frequency of this wave. By changing the amplitude of the ultrasonic wave, it is likewise possible to influence the intensity of the diffracted radiation. If the deflection cell 50 of FIG. 4 is supplied by an alternating voltage generator whose frequency is controlled by the scanning signal $S_Y$ and whose amplitude is controlled by the modulating signal $S_Z$, then simultaneously deflection and modulation of the light beam are effected.

Figure 5:
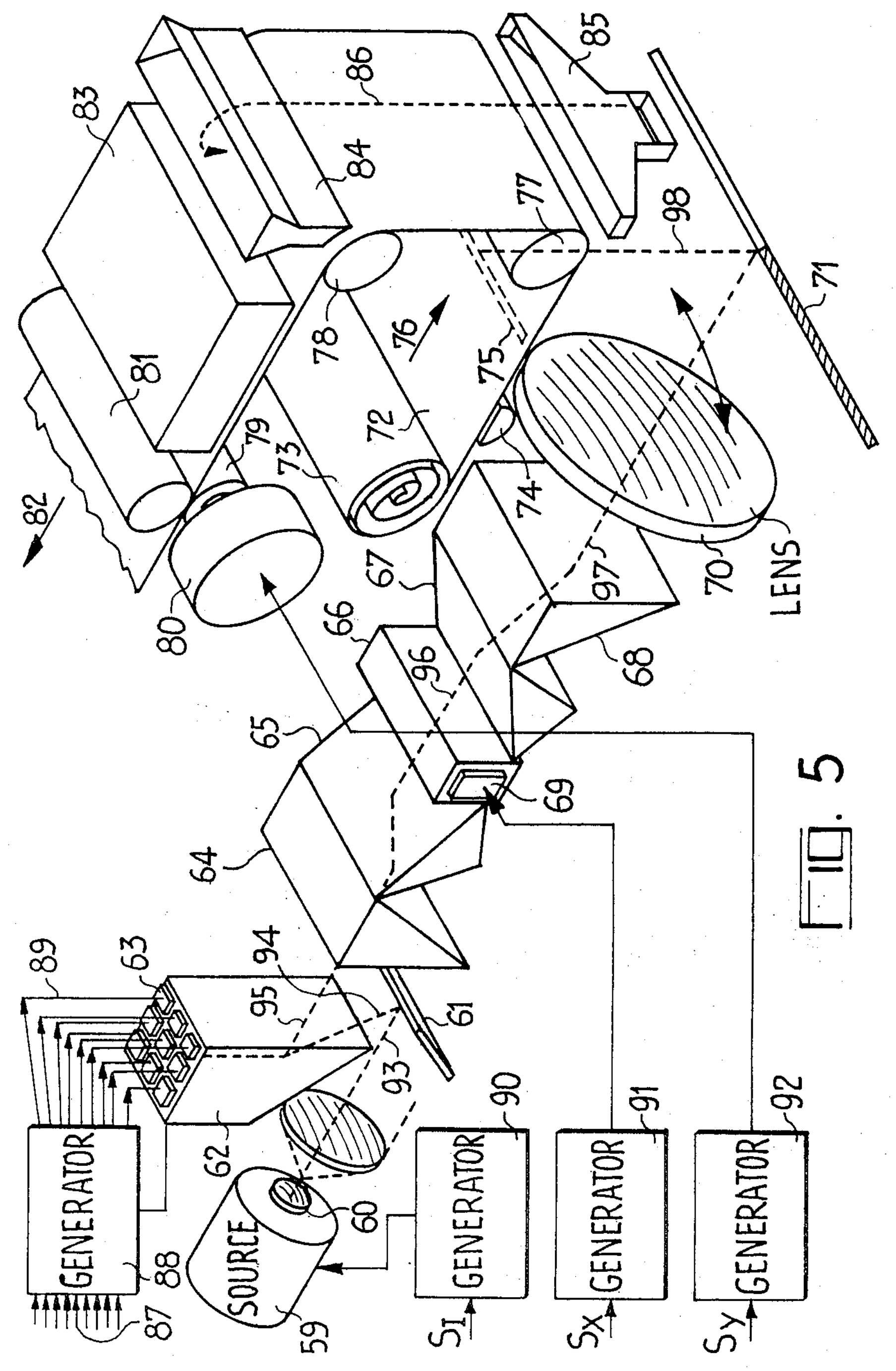
FIG. 5 illustrates a second variant embodiment of the system shown in FIG. 1.

In FIG. 5, a second variant embodiment of the graphic reproduction system of FIG. 1, can be seen. This variant embodiment utilises a deflector similar to those of FIG. 4 ; it is superfluous, therefore, to recapitulate the operation of the acousto-optical cell 66, 69, but the prisms 64 and 65 are utilised to thin down the section of the optical beam in the direction perpendicular to the deflection plane of the cell, in order to concentrate the beam on the acoustic beam created in the cell 66 by the transducer 69. The prisms 67 and 68 re-establish the initial beam section. The advantage of this system is that it has no aberrations. Moreover, the optical beam having been thinned down over a very short distance, the effects of diffraction are negligible.

As in the preceding figure, the light beam follows a trajectory marked in broken line, the portions 95, 96 and 97 of which are those corresponding to transit of the deflector. The control of the deflection function is achieved by means of the genertor 91 which excites the transducer 69 with an alternating voltage whose frequency is associated with the amplitude of the electrical scanning signal $S_X$.

The acousto-optical modulator of FIG. 5 is a spatial modulator comprising a double-refracting block 62 with an oblique bottom face and a top face carrying a plurality of electromechanical transducers 63.

The oblique bottom face of the block 62 is supplied, via a mirror 61, with a monochromatic light beam 94 ; the latter is produced from a parallel beam 93 emanating from a light source 59 associated with an afocal system 60. The beam 94 has its electrical vector located in the plane of incidence ; it is refracted inside the block 63 and passes back upwards again perpendicularly to the face carrying the transducers 63. A composite electrical generator 88 is connected by a plurality of leads 89 to the transducers 63. These latter receive alternating voltages which result in the emission of ultrasonic beams interacting with the light energy refracted by the oblique face of the block 62 ;electrical modulating signals 87 are applied to the generator 88 in order to separately control the intensities of the ultrasonic beams. The opto-acoustical interaction gives rise in the block 62 to light beams whose electrical vectors are perpendicular to the plane of incidence of the beam 94 ; after reflection at the face carrying the transducers 63, the beams meet the oblique bottom face at an angle of incidence such that they experience total reflection there ; the result is that this diffracted energy leaves the block 62 in the direction 95. This does not apply to the undiffracted light energy fraction which leaves the block 62 in the same way that it entered. The operation of the spatial modulator 62, 63 is essentially the same as that of the device of FIG. 3. As explained hereinbefore, the transducers 63, depending upon whether they are excited or not, do or do not produce reflection of the light beams. The beam 95 is thus spatially modulated as if it had emanated from a mosaic of light sources.

In FIG. 6, a plan view of the block 62 can be seen ; the top face of the block 62 is a reflective conductive face, to which a piezoelectric wafer 99 has been soldered ; the top of the wafer 99 carries a mosaic of electrodes 63 ; if the electrodes 63 which are not shown cross-hatched in the FIG. 6, are excited, it will be appreciated from the foregoing that the light beam emerging from the modulator will contain a spatial modulation corresponding to the letter R and this letter will stand out against a dark background. By changing the mode of excitation of the electrode 63 under the control of the electrical signals 87, it is possible to synthesise a large number of separate graphic symbols.

The beam 97 emerging from the prism 68 is spatially modulated and deflected in a deflection plane perpendicular to the triangular faces of the prisms 64, 65, 67 and 68. The projection lens 70 and the mirror 71 project in the direction 98 an image of the transverse section of the beam 97 ; this image is formed on a recording line 75 of the optical detector 72.

Figure 7A:
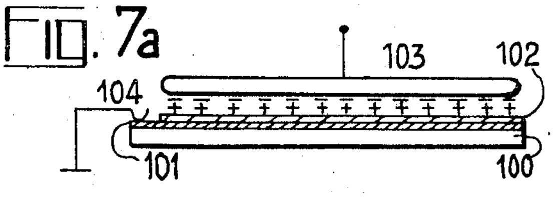
Figure 7B:
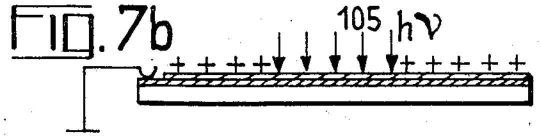
Figure 7C:
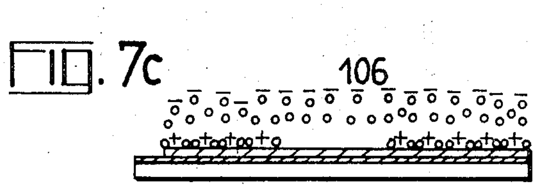
Figure 7D:
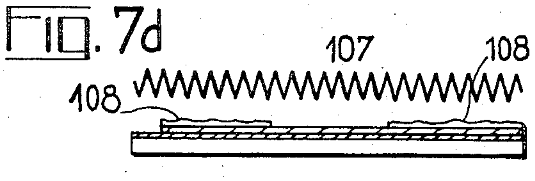

The optical detector employed in the system of FIG. 5 is a photosensitive paper whose structure and method of utilisation are set out in FIGS. *7a*, *7b*, *7c* and *7d*. This paper takes the form, i FIG. 7a, of an insulating substrate 100 whose top face carries a metallised film 101 ; on top of this metallised film 101 there is deposited a semiconductor film, for example sinc oxide $Z_nO$.

In FIG. *7a*, the paper is electrostatically charged by means of a sensitising electrode 103 raised to a high negative potential in relation to a brush 104 which earths the metallisation 101. Positive charges are induced at the surface of the semiconductor 102 and these charges remain there as long as the semiconductor is dark. In FIG. *7b*, the sensitised paper is illuminated by a light beam 105 so that the positive charges disappear in the illuminated zone. In FIG. *7c*, the printed paper is shown in the presence of a cloud of negatively charged particles 106 which deposit at the charged areas of the paper. In FIG. *7d*, the particle deposit has been fused by means of an infra-red radiation source 107 which acts as a fixer. The fused or melted zones 108 surround the illuminated zones.

Returning to the description of FIG. 5, it will be seen that the sensitive paper 72 is paid off from a reserve 73 ; it is transported in the direction 76 and successively encounters a sensitising electrode 72 and an exposure slot 75 ; transport rollers 77 and 78 cause the printed paper to ascend before a downward flow of pigmented particles issuing from a reservoir 84 and collected in a hopper 85 ; the particles are returned by the trajectory 86, to the reservoir 84. After having been loaded with particles, the paper is fixed by means of a heat source 83 ; it then passes between the cylinders 18 and 79 of the drive mechanism 80 ; the reproduced document is available at 82. Since the system of FIG. 5 only uses one deflector system, a line of characters is recorded and then slow-speed transfer of the paper 72 to register the next line, is effected. This displacement is controlled by the device 80. The control of the paper feed is carried out by a generator 93 which receives a signal $S_Y$ at the end of each written line. The signals 87, $S_Y$ and $S_X$ are produced by the data source to which the graphic reproduction system is connected ; the light source 59 can likewise be controlled by a signal $S_t$ acting on its supply generator 90, as soon as the modulator 62–63, the deflector 64 to 68 and the device 80 have been addressed.

The reproduction of a text such as carried out by the system of FIG. 5, presumes that the data relating to the printing of the text are concerned with the nature of the characters and their position in the text. If the text which is to be graphically reproduced is already displayed upon the screen of a long-persistent cathode-ray tube, the graphic reproduction system can be simplified by adopting the field-scan technique.

In FIG. 8, a particularly simple and compact graphic reproduction system can be seen. It comprises an acousto-optical deflector the elements 112, 113, 114, 115, 116, 117 and 118 of which have already been described ; a monochromatic light source 109 supplies a beam whose trajectory is shown in broken line. An acousto-optical modulator comprising a reflective block 110, transmits the intensity-modulated beam 132 ; on one of the lateral faces of the block 110 there is fitted an electromechanical transducer 111 which obliquely directs an ultrasonic wave onto the light beam. The ultrasonic wave is produced by the application to the transducer 111 of an alternating voltage produced by the generator 127 ; this voltage is amplitude-modulated by an electrical signal $S_Z$ characterizing the text or graphic character to be reproduced. Under the action of the ultrasonic wave, the light energy received by the block 110 is split into a radiation fraction 132 of zero order and a diffracted radiation fraction 131 which passes outside the deflection system. It is exclusively the energy of the beam 132 which is deflected and since it diminishes as the amplitude of the ultrasonic wave rises, at the output of the prism 116 a deflected light beam is obtained carrying the amplitude modulation imposed by the signal $S_Z$. A projection lens 118 associated with a total reflection prism 119, projects the beam 134 in the form of a beam 135 which converges at a point on the recording line 121 of an optical detector 120. The optical detector 120 will be constituted, for example, by a dry silver paper in which a latent image is converted to a visible image under the action of thermal radiation. The paper 120 is paid off from a reserve 120 and is transported past the recording line ; a drum connected to a drum mechanism 123 transfers the paper which, after exposure, enters a thermal developing oven 125. The transfer of the paper is controlled by a signal $S_Y$ acting upon the power source 129 which operates the mechanism 123. Through the opto-acoustic scanning of the line 121 and the translatory motion of the paper, a field can be printed which faithfully reproduces the shades contained in the image transmitted by the signal $S_Z$.

Without departing from the scope of the invention, it is also possible to provide a graphic reproduction system in which the paper is fixed ; the deflector can have a slow rotational motion about an axis perpendicular to the plane of the paper, the acousto-optical deflection producing a radial displacement of the point of impact of the deflected beam. This kind of system can be used for the creation of a graphic reproduction with polar coordinates. On the other hand, the graphic reproduction system can be associated with a document copying machine of the xerox type in order to produce arbitrary numbers of copies ; in this case, the optical detector is constituted by a semiconductor film which is used as an electrostatic matrix for transferring the electrical charge to any insulating substrate.

What we claim is:

1. Graphic reproduction system for storing onto a substrate graphic information items under the control of electrical signals supplied from a data source, said system comprising : a substantially monochromatic source emitting a beam of radiant energy, photosensitive recording means positioned for receiving said beam, and acousto-optical means positioned between said monochromatic source and said photosensitive recording means, said acousto-optical means being controlled by said electrical signal for causing said beam to scan said photosensitive recording means along at least one direction and to modulate the intensity of the radiant energy falling onto said photosensitive recording means ; said acousto-optical means comprising at least one refringent medium located on the the transmission path of said beam, and ultrasonic generator means controlled by said electrical signals for radiating within said medium at least one ultrasonic wave intersecting said beam ; said ultrasonic wave creating within said medium a refractive diffraction grating selectively scattering toward said photosensitive recording means a portion of said radiant energy ; said acousto-optical means comprising acousto-optical deflection means and acousto-optical modulating means ; said deflection means comprising at least one deflection unit including an acousto-optical deflection cell and first and second anamorphotic means ; each of said anamorphotic means embodying at least one prism, and said cell being positioned between said first and second anamorphotic means.

2. Graphic reproduction system as claimed in claim 1, wherein said photosensitive recording means comprise a photosensitive film deposited upon a substrate and means for developing the latent image formed in said film by said beam.

3. Graphic reproduction system as claimed in claim 1, wherein said anamorphotic means are constituted by trains of prisms.

4. Graphic reproduction system as claimed in claim 3, wherein said trains of prisms are arranged symmetrically in relation to the ultrasonic propagation axis of said cell.

5. Graphic reproduction system as claimed in claim 1, wherein said photosensitive recording means comprise a semiconductor film deposited upon a conductive substrate and a sensitising electrode for electrostatically charging said film ; means being provided for applying a voltage to said electrode ; said modulated and deflected beam being directed onto a portion of said film charged by said electrode.

6. Graphic reproduction system as claimed in claim 5, wherein the portion of said film irradiated by said beam is placed in the presence of electrically charged pigmented particles ; thermal fixing means being provided for fusing the particles deposited on said film.

7. Graphic reproduction system as claimed in claim 1, wherein said photosensitive recording means comprise a dry silver paper and thermal means for converting the latent image formed on said paper into a visible image.

8. Graphic reproduction system as claimed in claim 1, wherein mechanical transport means are provided for translating said photosensitive recording means in a direction at an angle with the direction of scanning of said beam.

9. Graphic reproduction system as claimed in claim 1, wherein the scanning of said photosensitive recording means by said modulated and deflected beam consists in a raster comprising a plurality of parallel lines.

10. Graphic reproduction system as claimed in claim 1, wherein optical viewing means are provided for observing said modulated and deflected beam.

11. Graphic reproduction system as claimed in claim 1, wherein a projection lens is arranged between said photosensitive recording means and said acousto-optical deflection means.

12. Graphic reproduction system as claimed in claim 1, wherein said ultrasonic generator means comprise : electromechanical transducer means and an alternating voltage generator coupled to said transducer means ; said generator being controlled by said signals to modulate the amplitude and frequency of said alternating voltage.

13. Graphic reproduction system as claimed in claim 1, wherein the deflection plane of said cell is parallel to the plane perpendicular to the entry and exit faces of said prism.

14. Graphic reproduction system for storing onto a substrate graphic information items under the control of electrical signals supplied from a data source, said system comprising : a substantially monochromatic source emitting a beam of radiant energy, optical detection means positioned for receiving said beam, and acousto-optical means positioned between said monochromatic source and said optical detection means, and acousto-optical means being controlled by said electrical signals for causing said beam to scan said optical detection means along at least one direction and to modulate the intensity of the radiant energy falling onto said optical detection means; said acousto-optical means comprising at least one refringent medium located on the transmission path of said beam, and ultrasonic generator means controlled by said electrical signals for radiating within said medium at least one ultrasonic wave intersecting said beam ; said ultrasonic wave creating within said medium a refractive diffraction grating selectively scattering toward said optical detection means a portion of said radiant energy ; said acousto-optical means comprising acousto-optical deflection means, and acousto-optical modulating means ; said deflection means comprising at least one deflection unit including an acousto-optical deflection cell and first and second anamorphotic means ; each of said anamorphotic means embodying at least one prism, and said cell being positioned between said first and second anamorphotic means ; the entry and exit faces of said prism make with one another an angle equal to the complement of the Brewster angle $\theta$ ; the tangent of said angle being the refractive index n of the medium from which said prism is cut.

15. Graphic reproduction system for storing onto a substrate graphic information items under the control of electrical signals supplied from a data source, said system comprising : a substantially monochromatic source emitting a beam of radiant energy, optical detection means positioned for receiving said beam, and acousto-optical means positioned between said monochromatic source and said optical detection means, said acousto-optical means being controlled by said electrical signals for causing said beam to scan said optical detection means along at least one direction and to modulate the intensity of the radiant energy falling onto said optical detection means ; said acousto-optical means comprising at least one refringent medium located on the transmission path of said beam, and ultrasonic generator means controlled by said electrical signals for radiating within said medium at least one ultrasonic wave intersecting said beam ; said ultrasonic wave creating within said medium a refractive diffraction grating selectively scattering toward said optical detection means a portion of said radiant energy ; said acousto-optical means comprising acousto-optical deflection means, and acousto-optical modulating means; said modulating means comprising an acousto-optical spatial modulator ; said spatial modulator being constituted by a block of double-retracting material having an entry face oblique in relation to the incident portion of said beam, and a reflective face carrying a mosaic of electromechanical transducer elements.

16. Graphic reproduction system as claimed in claim 15, wherein said transducer elements are constituted by a single piezoelectric wafer having two faces ; said wafer carrying on one of its faces a common electrode, and on the other of its faces a plurality of separate electrodes.

* * * * *